No. 638,135. Patented Nov. 28, 1899.
C. S. OSBORN.
BREAD CUTTER.
(Application filed July 16, 1898.)
(No Model.)
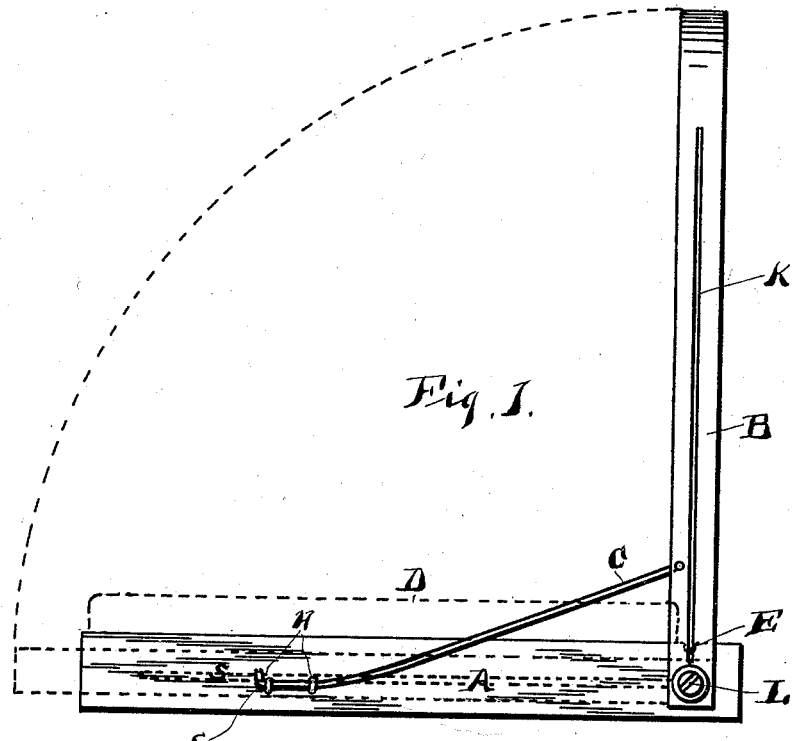
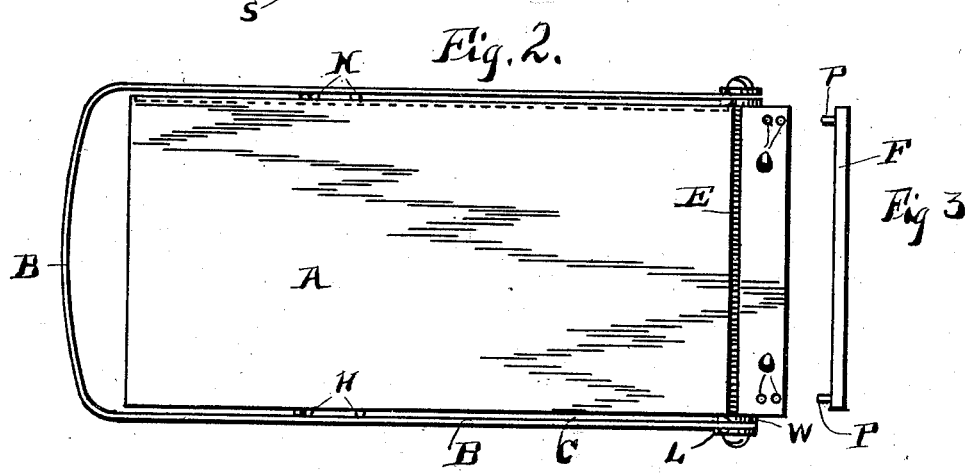
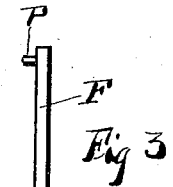
WITNESSES.
Harry J Perkins,
Christopher Hondelink
INVENTOR.
Clinton S Osborn
BY his ATTORNEY
Edward Taggart

UNITED STATES PATENT OFFICE.

CLINTON S. OSBORN, OF DETROIT, MICHIGAN.

BREAD-CUTTER.

SPECIFICATION forming part of Letters Patent No. 638,135, dated November 28, 1899.

Application filed July 16, 1898. Serial No. 686,151. (No model.)

*To all whom it may concern:*

Be it known that I, CLINTON S. OSBORN, a citizen of the United States, residing at Detroit, in the county of Wayne and State of Michigan, have invented new and useful Improvements in Bread-Cutters, of which the following is a specification.

This invention has for its object to provide a novel, simple, and efficient bread cutter or slicer wherein a folding knife-guide is firmly held folded or unfolded by an inherently-elastic or spring brace applied as hereinafter described.

Figure 1 shows a side elevation of my improved bread-cutter with the guide raised to a perpendicular position. Fig. 2 shows a plan view of the same with the guide folded over the base or board. Fig. 3 shows the gage for regulating the thickness of the slice of bread cut.

Like letters refer to like parts throughout the several views.

A represents the base, which is composed, preferably, of wood and made of suitable shape and size to receive a loaf of bread or other similar article. At one side of this base I prefer to use a plate, (shown in dotted lines by D,) said plate being adapted to retain the loaf upon the base in proper position.

B represents the knife-guide, composed of a single piece of metal bent into the shape of a yoke and having the extremities of its side arms pivoted, as at L, to the side edges of the base A. The side arms of the yoke-shaped knife-guide are provided with slots K to receive and guide the bread cutting or slicing knife. The knife-guide can be folded down in a plane with the base, as in dotted lines, Fig. 1, and full lines, Fig. 2, or be turned to a perpendicular position, as in full lines, Fig. 1, and to firmly maintain the guide folded or unfolded I provide the inherently-elastic or spring brace and guide-loops, which I will now describe.

The brace C is composed of a spring wire or rod of any suitable shape or form, pivotally engaging at one end with the guide B and at the other end passing through two loops or eyelets secured to the base A, so as to give a downward pressure to the pivoted end of the rod or wire. These loops are shown by H H. They may be composed of two staples. This brace is provided, preferably, with a stop S, which may be formed by turning up the free end of the brace. As the guide B is folded the brace C will slide through the loops H H, allowing the guide to be folded from the position shown in Fig. 1 to the position shown in Fig. 2. The guide B being made of one piece and pivoted on both sides to the base A, the pivotal points being shown by L L, when folded forms a loop by means of which the whole can be suspended upon a hook or pin. In a line with the slots in the guide when raised to a perpendicular position I provide a depression in the base A, (shown by E,) allowing the knife to pass entirely through the loaf of bread before coming in contact with the base.

For the purpose of regulating the thickness of the slice to be cut, I provide an adjustable gage F, which may be made of a strip extending transversely across the base and provided with pins P P, as shown in Fig. 3. These pins engage with holes O in the base. These holes may be placed obliquely, and any number may be used, and the gage may be composed of a wire instead of a strip with pins attached, and when made of wire the ends of the wire are bent to engage with the holes in the base. By setting these pins in the outer holes or those nearest to the end of the base A a thicker slice may be cut, or by moving them to the inner holes a thinner slice is cut. The number of holes may be varied to suit the user or manufacturer. Instead of using the stop S, as shown, any other suitable stop may be used for stopping and retaining the guide B in its upright position when opened ready for use.

In the example of my invention shown in the drawings I have shown a brace on but one side of the base A; but it will be evident that a brace may be used on both sides if found desirable. Should a brace be used on the side upon which is placed the longitudinal plate D, it would be placed outside of the plate, so as to allow the guide B to fold over in the position shown in Fig. 2.

W is a washer placed between the pivotal end of the guide B and the base A for the purpose of holding the guide a sufficient distance from the base to allow room for the brace C to pass between the guide B and the base A when the same is folded.

Having thus described my invention, what I claim to have invented, and desire to secure by Letters Patent, is—

1. As an improved article of manufacture, a bread-cutter, consisting of a base having its side edge provided with a series of separated, lateral guide-loops, a slotted yoke-shaped knife-guide pivoted to the base, and an inherently-elastic brace-rod pivoted to the knife-guide above its pivotal attachment to the base and extending through and sliding in the lateral guide-loops which exert downward pressure on the pivoted end portion of said elastic brace-rod, to maintain the pivoted knife-guide firmly upright or horizontal, substantially as and for the purposes described.

2. The combination, in a bread-cutter, of the base A, having a lateral brace-rod guide at one side edge, the slotted, yoke-shaped knife-guide B, pivoted to the base, and the inherently-elastic brace-rod C extending through the guide-loops and having one end bent to form the stop c, and the other end pivoted to the knife-guide above the pivotal attachment of the latter to the base, said guide acting to exert downward pressure on the pivoted end portion of the brace-rod, to maintain the pivoted knife-guide firmly upright or horizontal, substantially as and for the purposes described.

In testimony whereof I have hereunto set my hand in presence of two subscribing witnesses.

CLINTON S. OSBORN.

Witnesses:
 EDWARD TAGGART,
 CHRISTOPHER HONDELINK.